US007609871B2

(12) United States Patent
Ruth et al.

(10) Patent No.: US 7,609,871 B2
(45) Date of Patent: Oct. 27, 2009

(54) AUTOMATIC REGION OF INTEREST LOCATOR FOR AP SPINAL IMAGES AND FOR HIP IMAGES IN BONE DENSITOMETRY

(75) Inventors: Christopher Ruth, Danvers, MA (US); Howard P. Weiss, Newton, MA (US); Kevin E. Wilson, Waltham, MA (US); Eric Von Stetten, Stow, MA (US); Tom Richardson, Winchester, MA (US)

(73) Assignee: Hologic, Inc., Bedford, MA (US)

( * ) Notice: Subject to any disclaimer, the term of this patent is extended or adjusted under 35 U.S.C. 154(b) by 627 days.

(21) Appl. No.: 10/937,516

(22) Filed: Sep. 8, 2004

(65) Prior Publication Data

US 2005/0094859 A1    May 5, 2005

Related U.S. Application Data

(63) Continuation of application No. 09/721,644, filed on Nov. 24, 2000, now Pat. No. 6,853,741.

(60) Provisional application No. 60/148,027, filed on Aug. 10, 1999, provisional application No. 60/167,396, filed on Nov. 25, 1999.

(51) Int. Cl.
*G06K 9/00* (2006.01)
(52) U.S. Cl. ....................................... 382/132; 382/130
(58) Field of Classification Search .......... 382/128–134
See application file for complete search history.

(56) References Cited

U.S. PATENT DOCUMENTS

| 5,228,068 A | 7/1993 | Mazess |
| 6,246,745 B1* | 6/2001 | Bi et al. ........................ 378/54 |
| 6,438,201 B1 | 8/2002 | Mazess et al. |
| 6,442,287 B1* | 8/2002 | Jiang et al. .................. 382/128 |

* cited by examiner

*Primary Examiner*—Wesley Tucker
(74) *Attorney, Agent, or Firm*—Cooper & Dunham

(57) ABSTRACT

In DEXA (dual energy x-ray absorptiometry), a system for automatically or nearly so identifying a region of interest in an AP (anterior/posterior) spinal image by processing the pixel values within a global region to find the lateral extent of the vertebra and the spaces between vertebra, and further processing the pixel values within the region of interest to derive estimates of bone parameters. In addition, also in DEXA, a system for automatically locating regions of interest in the hip.

9 Claims, 4 Drawing Sheets

Figure 1:
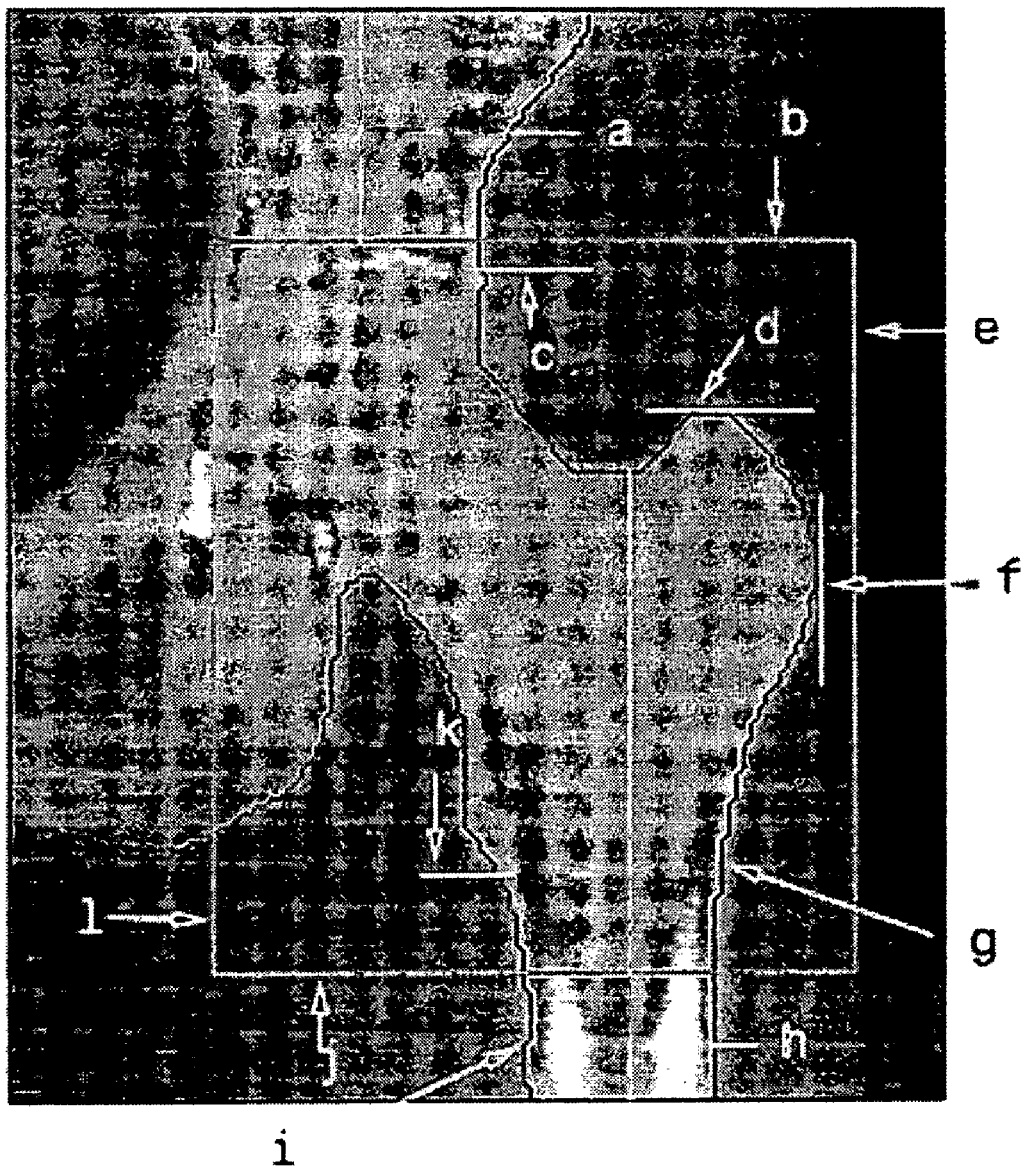

AUTOMATIC REGION OF INTEREST LOCATOR FOR AP SPINAL IMAGES AND FOR HIP IMAGES IN BONE DENSITOMETRY

REFERENCE TO RELATED APPLICATIONS

This application is a Rule 1.53(b) continuation, and claims the priority, of U.S. Ser. No. 09/721,644, filed Nov. 24, 2000 now U.S. Pat. No. 6,853,741, which claims the benefit of the filing dates of each of provisional patent applications Ser. Nos. 60/148,027 filed on Aug. 10, 1999 and 60/167,396 filed on Nov. 25, 1999. The entire contents of Ser. Nos. 09/721,644, 60/148,027 and 60/167,396 are incorporated herein by reference.

FIELD

This patent specification is in the field of x-ray bone densitometry, often referred to as DEXA (dual energy x-ray absorptiometry), and more specifically pertains to locating a region of interest.

BACKGROUND

One of the techniques used in DEXA is to estimate BMD (bone mineral density) of vertebrae from AP (anterior/posterior or posterior/anterior) view measurements of x-ray attenuation at two different x-ray energy ranges. For example, when a supine patient is between an x-ray source below (or over) and an x-ray detector above, the detector can obtain sufficient information for a DEXA AP view of the spine, or of part thereof, from measurements of x-ray attenuation due to passage of the x-rays through the patient. The DEXA x-ray dosage typically is much less than for a diagnostic image, but the DEXA image still contains enough information from which BMD and other parameters can be estimated. If the BMD or some other parameter for a particular vertebral region in the AP image is desired, the region is delineated, for example by having an operator draw the outline of the region on a screen displaying the AP image. The assignee of this patent specification has manufactured and sold such DEXA equipment for years, including under the trade name QDR. See, e.g., commonly assigned U.S. Pat. Nos. 5,778,045 and 5,432,834, which are hereby incorporated by reference.

Another DEXA technique is lateral vertebral morphometry, in which a lateral rather than an AP image of vertebral bodies is obtained and its information is used, in turn, to obtain measurements or estimates of the size and/or shape of vertebral bodies. One example of DEXA morphometry is described in commonly owned U.S. Pat. No. 5,850,836, which is hereby incorporated by reference, and a morphometry option has been available for years from the common assignee, Hologic Corporation of Bedford, Mass. Another type of morphometry is discussed in U.S. Pat. No. 5,228,068 and a DEXA morphometry capability also has been available in this country for years from that patent's assignee, Lunar Corporation of Madison, Wis.

Another technique used in DEXA is to identify regions of interest in hip images, e.g., areas of interest in AP projection images of the left or right hip. These regions of interest may comprise a global region and sub-regions within this global region.

SUMMARY

On one embodiment, a system disclosed in this patent specification automatically or nearly automatically identifies the area occupied by individual vertebra in an AP spine image in DEXA, whereby the attenuation information for that area can be used to calculate or estimate bone parameters such as BMD. The input comprises x-ray measurements for a greyscale anterior-posterior (AP) projection image that includes at least a part of the spine, and two or one (or none) operator selected points on the image displayed on a monitor or some other display. The output is a region of interest (ROI) that identifies a specified number of vertebra. The ROI comprises a set of subregions, each of which surrounds a given vertebra. In general the lines defining the subregions are not straight lines, and the algorithm can be used to identify any number of vertebra, down to a single one, in which case the region and the subset are the same.

Three versions of the method require different amounts of operator input. For the sake of this discussion, let the final ROI include four subregions identifying the lumbar vertebral bodies L1 through L4.

Two Point Method: The operator places two input points on the image. One point is placed between vertebra T12 and L1 and a second point is placed between vertebra L4 and L5. For example, this can be done by clicking a computer mouse when the cursor is at the desired points on a DEXA image of the spine displayed on a monitor.

One Point Method: The operator places one input point on the image between L4 and L5.

Zero Point Method: No user input required.

The input points referred to above may be placed anywhere on lines separating individual vertebra (the separator lines).

Let the long axis of the spine be vertical or at least extending generally in the up-down direction, and the separator lines be horizontal or at least transverse to the long axis of the spine. An algorithm implementing the disclosed system on a computer, for example the computer that otherwise is a part of a DEXA system, uses two one-dimensional signals derived from the image data to locate the separator lines of interest. The minima of the signals are found and are used in an error minimization procedure based on specific assumptions regarding the anatomy of the spine. The output of the minimization procedure is a set of minima that correspond to the ideal separator lines. The remaining vertical lines of the ROI are defined in terms of the spine center and the average spine width, which can be found automatically for the input image.

The resultant ROI can be used to obtain specific vertebral measurements such as bone mineral density in dual energy x-ray imaging.

In another embodiment disclosed in this patent specification, a system automatically identifies region(s) of interest for DEXA hip images. The input comprises the pixel values of a greyscale anterior-posterior (AP) projective image of the left or right hip. The output comprises a region(s) of interest (ROI) that include a global region and subregions within the global region. The ROI identifies sites such as the femoral neck, trochanter, and the inter-trochanter and can be used to obtain site specific measurements of bone mineral density (BMD) that can be used to assess fracture risk. The global region is defined with respect to anatomical features in the image including the greater trochanter, lesser trochanter, and femur head that are present in the image. Refer to FIG. 1. Let the image comprise a set of pixel values correlated with x-ray attenuation or bone mineral density. Let the pixel values be arranged in a two dimensional matrix of rows and columns where the long axis of the femur shaft is substantially parallel to a given column. The following steps can be used to locate the anatomical features and define the global ROI.

1. Locate the femur shaft center line (colfc). The first few rows of pixels of the image are substantially perpendicular to the femur shaft. The image is smoothed using a boxcar filter. The two largest peaks in a given row of the smoothed image are located. The peak locations correspond to the medial and lateral bone edges of the femur and the average location of the two peaks gives the center line for that row. The center line is found in this way for a specified number of rows and averaged to give colfc.

2. Locate points on the medial and lateral bone edges of the femur. The lateral bone edge includes the greater trochanter and the medial bone edge includes the lesser trochanter. Smooth the image with a boxcar filter. Compute the derivative (in the column direction) for a given row at the femur shaft. Locate two maxima in the derivative. These maxima occur at the bone edges. This gives a first approximation of the medial and lateral bone edges for a given row.

3. Find the medial and lateral bone edges of the femur using the Local Threshold Method (LTM). This method is described in a separate section below.

4. Locate the lesser trochanter (rowlt) using the medial bone edge of the femur. The lesser trochanter protrudes out (medially) from the bone edge. This is found by locating the maximum in a spatial derivative of medial femur bone edge. The derivative is calculated at each point along the bone edge with respect to the column location.

5. Locate the maximum column of the lateral femur edge (colgt). This gives the furthest lateral point of the greater trochanter.

6. Locate the top of the greater trochanter (rowgt). A column is chosen a specified number of columns less than colgt. The derivative is calculated along this column and the maximum is found.

7. Locate the illium center line (colil). This column may be found by smoothing the image and searching for a maximum in each smoothed row near the illium. The illium is located near the top of the image so the operation is restricted to that region. The average of the maxima for a specified number of rows defines the illium center line.

8. Locate the superior part of the femoral head (rowsh). The derivative of the image is calculated along colil. The maximum derivative occurs at rowsh.

9. Locate the medial part of the femoral head (colmh). First choose a row a specified number of rows less than rowgt. The location of the maximum image derivative along rowgt is colmh.

10. The Global region is a rectangular region defined by two rows and two columns. The superior boundary (rowgsup) is a specified number of rows relative to rowsh. The inferior boundary (rowginf) is defined as a specified number of rows below rowlt. If the lesser trochanter does not exist in the image (usually due to poor patient positioning), the location of rowginf is given by rowginf=rowgt−a(rowgt−rowlt)+b, where a and b are constants. The lateral boundary (colglat) is defined as a specified number of columns relative to colgt. The medial boundary (colgmed) is defined as a specified number of columns relative to colmh.

In FIG. 1, the following Annotation Description applies:
colil (a)
rowgsup (b)
rowsh (c)
rowgt (d)
colglat (e)
colgt (f)
lateral femur bone edge (g)
colfc (h)
medial femur bone edge (i)
rowginf (j)
rowlt (k)
colgmed (l)
colmh (m)

A local threshold method (LTM) can be used to find the edges of bone. Given a starting point (pixel location) located at or near a bone edge LTM will locate all the points along the bone edge as follows:

1. The image is first smoothed. For optimum results the smoothing parameters depend on the orientation of the desired bone edge. For example, if the bone edge is oriented parallel to the columns, there is more smoothing in the column direction than in the row direction. In general, a rectangular averaging box is used where the width and height of the box depend on the orientation of the bone edge.

2. A local vector is defined containing a set of connected pixels centered on the starting point. The vector is substantially perpendicular to the bone edge. The direction of the bone edge can be determined by the direction of the maximum local derivative using known techniques.

3. The background is subtracted from the vector. The background is defined as the average value of a specified number of pixels located near the minimum (or near the a specified end point of the vector).

4. The maximum value is found in the background subtracted vector.

5. A threshold is defined as a percentage of this maximum.

6. The pixel values are tested sequentially from both ends of the vector to find the location(s) where values are greater or equal to the threshold. One of these locations is the bone edge.

7. The resultant bone edge pixel is used as the next starting point. For example, let the vector be parallel to the column direction and the edge pixel be located at (row, cole). The starting point for the next bone edge search is (row+1,cole) so that the local vector for row+1 is centered on cole. The steps are repeated a specified number of times or until the edge of the image is encountered.

In general the stepping direction (the location of the next starting point relative to the previous starting point) may be fixed or determined automatically by an algorithm. One method to determine the stepping direction is to find the normal to the edge and step perpendicular to the normal. The normal can be found by computing the ratio of derivatives in two perpendicular directions, for example the row and column direction. In this way the total bone edge will be found regardless of its shape. A fixed stepping direction is used if the orientation of the bone edge is known. The stepping direction is chosen to be the general direction of the bone edge. With a fixed stepping direction the process outlined above is repeated for different starting points and stepping directions on the same bone and the resultant edge vectors are connected to define the total bone edge.

Figure 2:
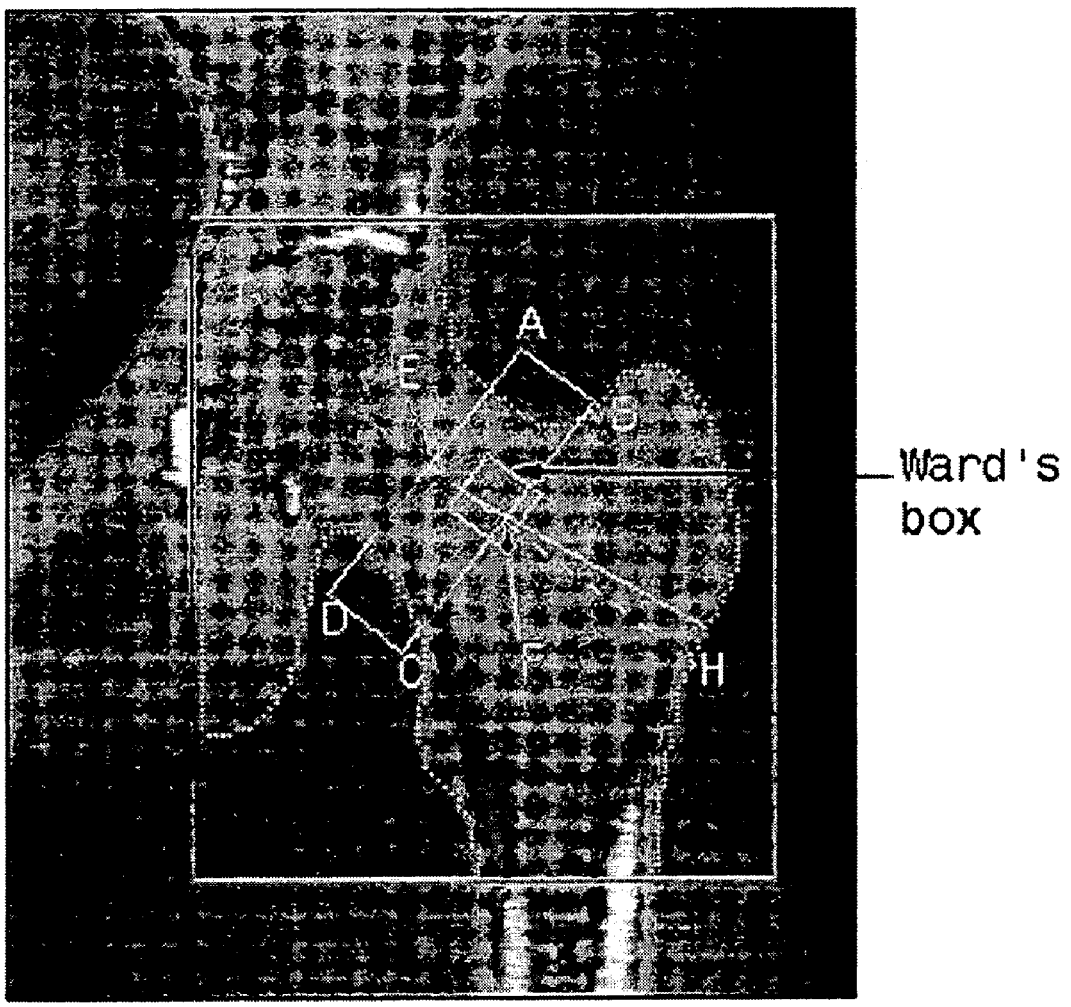

A standard method can be used for placement of the femoral midline and femoral neck box. FIG. 2 shows a standard region placement for a hip scan used by Hologic, the assignee hereof. In the previously commercially distributed Hologic software, the minimum distance between the bone edges in the femoral neck region was found. The femoral midline was drawn perpendicular and bisecting the line segment connecting the minimum distance between the bone edges in the femoral neck region. The intersection of these two line segments formed the center of a new coordinate system, with the femoral midline (line segment GH) aligning with the x-axis and the line segment connecting the minimum distance in the femoral neck region aligning with the y-axis.

Figure 3:
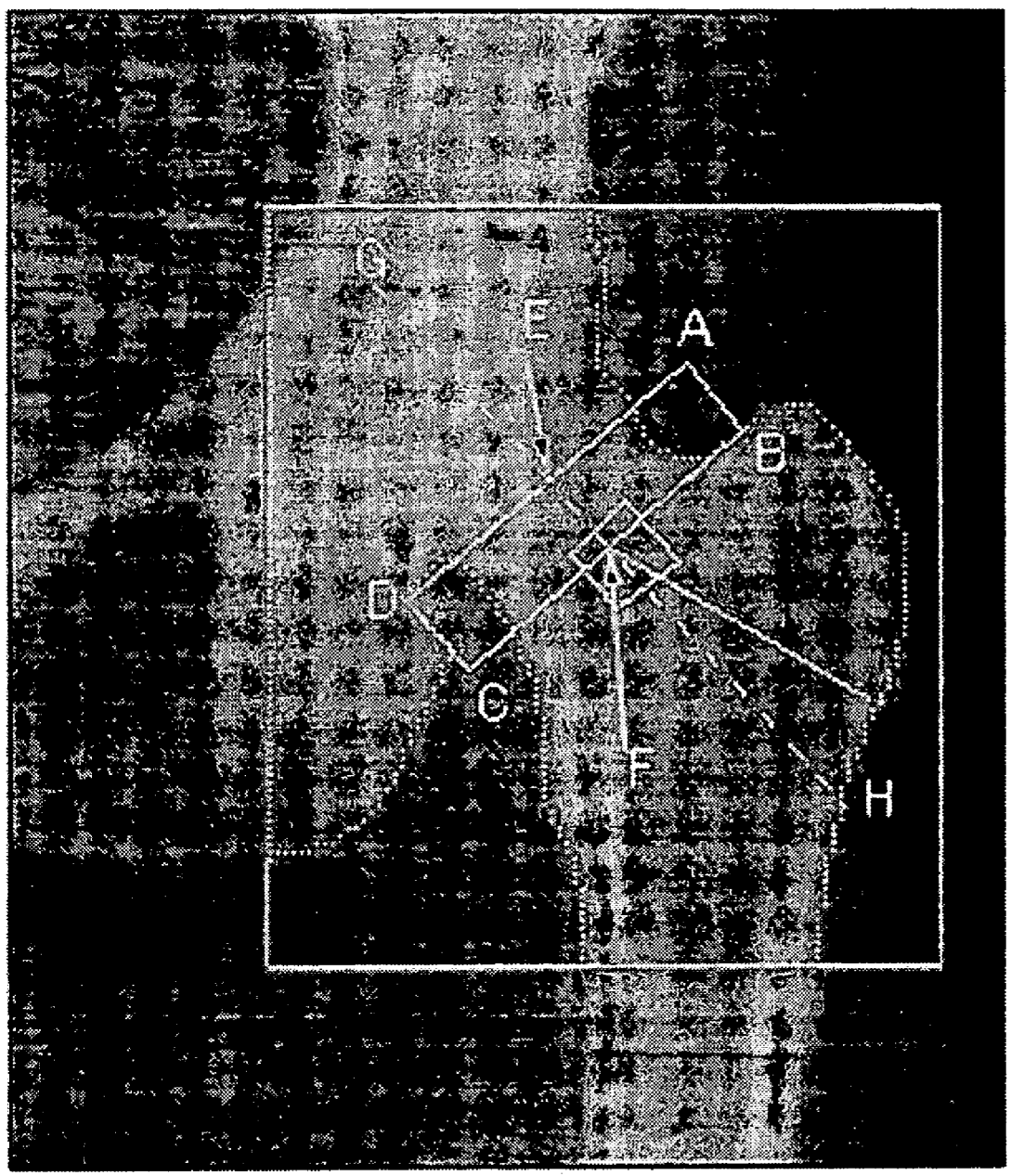

The femoral neck box, which has a width and length of 1.5 cm×5.0 cm was centered on this new coordinate system with its width (1.5 cm) parallel with the x-axis (femoral midline). The user was allowed to move the femoral neck box along and perpendicular to the femoral midline and was instructed to place the corner of the femoral neck box against the bone edge of the greater trochanter as shown in FIG. 2. Also shown in FIG. 2 is Ward's region. Further, the user was instructed to reduce the width of the femoral neck box if the femoral neck was very short, as in FIG. 3. Finally, the user was asked to paint out any bone of the ischium if it intruded into the femoral neck box, also shown in FIG. 3.

Preferred Embodiment for Automatic Placement of the Femoral Neck Box

Described below is a way to place the femoral neck box without necessitating user intervention.

Define the corners of the box in FIG. 1 as A, B, C, and D as shown. Define the intersection of the femoral neck box with the femoral midline as E and F. Working in the x-y coordinate system defined above, the automatic algorithm performs the following steps without user intervention after the femoral midline and femoral neck box have been placed by the standard algorithm:

1. Move the femoral neck box along the x-axis until point B just touches the edge of the bone map. Move the femoral neck box in the y-direction one pixel toward the femoral midline, if still in bone move one pixel in the y-direction away from the femoral midline and stop, otherwise repeat this step with the femoral neck box AB line segment at the new position in y.
2. If the line segment DE of the femoral neck box is completely in bone, reduce the width of the femoral neck box by moving line segment AD closer to BC until not all points on DE are in bone, or the minimum neck box width (1.0 cm) is reached.
3. If not all points along DE are in bone, but point D is in bone, remove bone within the femoral neck box which is not nearest neighbor connected within the femoral neck box to the bone containing EF.

Preferred Embodiments for AP Spinal Region-of-Interest Locator

Figure 4:
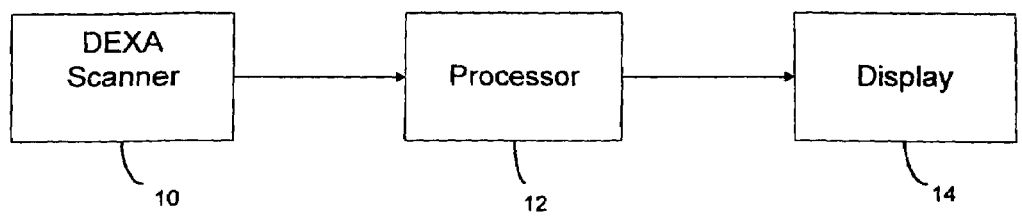

As illustrated in FIG. 4, a typical DEXA bone densitometer includes a scanner 10 where a patient is scanned with x-rays that impinge on a detector subsystem after passage through the patient to thereby produce x-ray measurements related to respective pixel positions. These measurements are processed in a processor 12, using known techniques, to produce an image and/or graphical/numerical representations of parameters related to bone properties or other information of interest. This description applied both to hip and to spine measurements and images.

Figure 5:
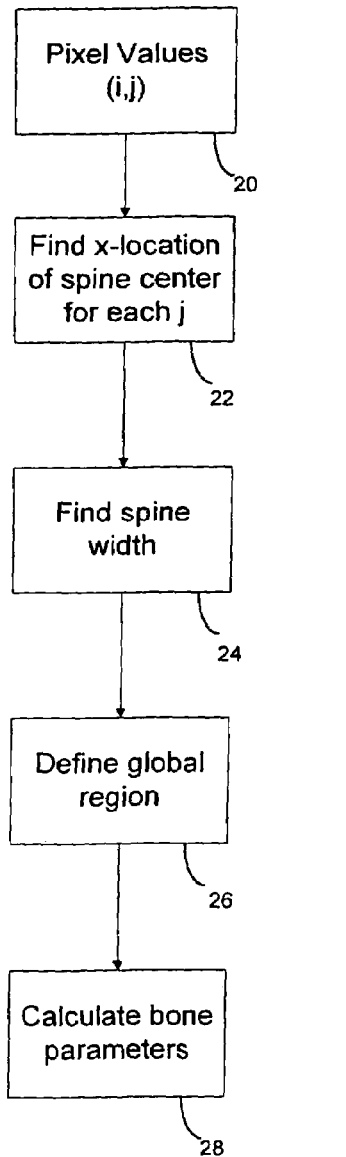

FIG. 5 illustrates a sequence of steps that can be carried out by processor 12. In step 20, processor 12 receives pixel values from scanner 10 defining an AP of PA image of the spine, in the manner known in DEXA systems.

Let the coordinate system of the DEXA spine image be the x-y-coordinate system where y is the vertical direction, generally along the long axis of the spine, and x is the horizontal direction perpendicular to the y-axis. The input image comprises pixels (i,j) at discrete locations (x,y).

The main steps of an algorithm implementing the disclosed process on a computer, such as the computer typically used in a processor 12, using the pixel values that are typically obtained in a DEXA system for an AP spine image, are:

1. Find the x location of the center of the spine for each j. This defines the approximate line along the center of the long axis of the spine referred to as the spine line, for example using processing such as described in the material incorporated herein by reference. This is illustrated at step 22 in FIG. 5.
2. Find the approximate width of the spine, for example using similar processing. This is illustrated at step 24 in FIG. 5.
3. Define a global region (less than or equal to the size of the input image). The global region is a bounding region encompassing all the vertebra of interest. The size of the global region depends on the number of input points, of a preset parameter. For example, in the two-point method the global region is the y-span between the two input points, in the one-point method the global region is the region above the input point up to a pre-specified y-span, and the zero-point method the global region is the entire image or some preset portion of the entire image. This is illustrated at step 26 in FIG. 5.
4. Find the minimum path (minpath) for each j in the global region. A minpath is a path (not necessarily a straight line) the extends a fixed number of pixels (along x) on each side of the spine line, where the sum of all the pixels along the path is a minimum relative to all other paths restricted to a local region. The minimum sum is referred to as the minpathsum. There is one minpathsum for each j in the global region. The test is for measured or calculated x-ray transmission at each pixel. This is a part of step 28 in FIG. 2, as are steps 5-9 discussed below.
5. Calculate the boxsums. A boxsum is a sum of the image values inside a box centered on the spine line. There is one boxsum for each j in the global region.
6. Smooth the minpathsum and boxsum to eliminate or reduce likely artifacts in the measured or calculated pixel values.
7. Use boxsum and minpathsum to locate the intervertebral separator lines. Basically, boxsum and minpathsum are treated as two input signals. Each input signal contains a number of minima referred to as dips. Some of the dips correspond to the desired vertebral separator paths. The goal is to select the desired dips from the signals. For example, for identifying L1 through L4, there are five desired dips. Each dip has a location in y that should correspond to a minpath that can be used to define a line in the ROI. The selection method is based on assumptions regarding the likely anatomy of the spine; the two most critical assumptions:
   a) The spacing between the desired dips is substantially constant; and
   b) The relative spacing between the desired dips and the dips in boxsum is known and can be used to rule out unwanted dips.
   The method by which the above two assumptions are utilized is based on an error minimization procedure.
8. Once the desired dips are selected they are subject to a final test regarding the spacing (in y) between them. If they do not pass the test, an additional simplified search is used to locate the desired dips. If no dips are found then a best guess is made based on the width of the spine.
9. Use the minpath at the desired dip locations to define the ROI. The actual line used in the ROI can be a processed version of the minpath. For example, the path may be straightened to produce a straight line for the ROI.

The ROI selected in this manner can then be used for further processing, for example in place of the manually defined ROI in commercial DEXA systems that have been available from the assignee hereof, and the result can be used in a known manner to estimate or calculate bone parameters, as illustrated at step 28 in FIG. 5, and display results as desired at display 14.

The invention claimed is:

1. A method of automatically determining a region of interest in hip scan data from a bone densitometer, comprising:
   computer-analyzing greyscale anterior-posterior projective image data of the hip of a patient taken with an x-ray bone densitometer to automatically, without necessitating user intervention, identify a global region that includes both soft tissue and bone and encompasses at least the femoral neck, trochanter and inter-trochanter portions of the patient's hip;
   computer-processing at least some of said image data to the extent related to the global region to identify, without necessitating user intervention, one or more sub-regions of interest selected from the femoral neck, trochanter and the inter-trochanter; and
   further computer-processing at least some of the image data to the extent related to the identified one or more sub-regions to obtain one or more site-specific estimates of bone mineral density data for the identified sub-regions for use in assessing fracture risk.

2. A method comprising:
   computer-analyzing grayscale, anterior-posterior, in-vivo, projective image data of the hip of a patient taken with a dual-energy bone densitometer to identify a global region of interest that contains both soft tissue and bone;
   computer-processing data functionally related to said image data obtained with the densitometer to (a) automatically identify, without necessitating user intervention, a global region of interest, and (b) automatically identify, without necessitating user intervention, one or more sub-regions of interest that are related to the global region and have selected positions with respect to selected bone anatomical features represented in said image data; and
   further computer-processing data functionally related to the image data obtained with the densitometer and pertaining to one or more of the sub-regions to derive site-specific estimates of bone mineral density related to bone present the one or more of the sub-regions for use in assessing future fracture risk for the patient.

3. A method as in claim 2 in which the one or more automatically identified sub-regions of interest comprise a sub-region encompassing a selected portion of a femoral neck represented in the image data.

4. A method as in claim 2 in which the computer-processing to identify the sub-regions comprises of pixel values to identify a centerline of a femur represented in the image data.

5. A method as in claim 2 including manually adjusting selected parameters of the global region following the automatic identification thereof.

6. A method as in claim 2 including manually adjusting selected parameters of the one or more sub-regions following the automatic identification thereof.

7. A method as in claim 2 including manually adjusting selected parameters of the global region and of one or more of the sub-regions following the automatic identification thereof.

8. A method of deriving information for assessing risk of bone fracture for a patient, comprising:
   obtaining in-vivo hip image data with a bone densitomer, said image data representing both regions of soft tissue and regions of bone;
   computer-processing the image data to automatically, without necessitating user intervention, identify at least one region of interest that includes both soft tissue and at least a portions of one or more of a femoral neck, trochanter, and inter-trochanter represented in the hip image data;
   further computer-processing data functionally related to said image data to automatically, without necessitating human intervention, obtain at least one site-specific estimate of bone mineral density, said site-specific estimate being for a selected portion of bone anatomy represented in the image.

9. A method as in claim 8 in which the region of interest comprises the femoral neck and adjacent soft tissue.

* * * * *